Oct. 10, 1933.  A. DINA  1,929,627
SUPPORT AND ADJUSTMENT FOR SPEAKING MOVIE SOUND LENS COMBINATION
Filed June 30, 1930  8 Sheets-Sheet 1

Fig.1.

INVENTOR
Augusto Dina
BY
Austin & Dix
ATTORNEYS

Oct. 10, 1933.  A. DINA  1,929,627
SUPPORT AND ADJUSTMENT FOR SPEAKING MOVIE SOUND LENS COMBINATION
Filed June 30, 1930  8 Sheets-Sheet 3

INVENTOR
Augusto Dina
BY
Austin & Dix
ATTORNEYS

Oct. 10, 1933.  A. DINA  1,929,627
SUPPORT AND ADJUSTMENT FOR SPEAKING MOVIE SOUND LENS COMBINATION
Filed June 30, 1930  8 Sheets-Sheet 6

INVENTOR
Augusto Dina
BY
Austin & Dix
ATTORNEYS

Oct. 10, 1933.  A. DINA  1,929,627
SUPPORT AND ADJUSTMENT FOR SPEAKING MOVIE SOUND LENS COMBINATION
Filed June 30 1930  8 Sheets-Sheet 7

INVENTOR
Augusto Dina
BY
Austin & Dix
ATTORNEYS

Oct. 10, 1933.                    A. DINA                    1,929,627
SUPPORT AND ADJUSTMENT FOR SPEAKING MOVIE SOUND LENS COMBINATION
                    Filed June 30, 1930              8 Sheets-Sheet 8

INVENTOR
Augusto Dina
BY
Austin + Dix
ATTORNEYS

Patented Oct. 10, 1933

1,929,627

UNITED STATES PATENT OFFICE 1,929,627

SUPPORT AND ADJUSTMENT FOR SPEAKING MOVIE SOUND LENS COMBINATION

Augusto Dina, Elizabeth, N. J., assignor to International Projector Corporation, New York, N. Y., a corporation of Delaware Application June 30, 1930. Serial No. 464,725

8 Claims. (Cl. 179—100.3)

This invention relates to new and useful improvements in supports and adjustments for lens combinations in moving picture apparatus and has particular reference to supports and adjustments for lens combinations which are used in connection with talking-movie apparatus for the purpose of transforming sound striata on the film into sound impulses.

A main object of the invention is to provide a simple, compact, durable, and accurately adjustable support for such a lens combination.

A further object is to provide a simple, compact, and readily operable device which can be adjusted and manipulated with the least expenditure of time and effort on the part of the operator.

A still further object is to provide a simple, compact, and accurate device that altho it is simple, and easily, and readily, and accurately adjustable as above mentioned, the entire unit is supported and held even during adjustment in absolute alinement and rigidly in relation to the parts with which it co-operates and so securely and rigidly that the change in position due to the adjustments, and the vibrations of the machine have a minimum effect upon the units to disturb the above mentioned co-operative relations.

Further and more specific objects, features, and advantages will more clearly appear from the detailed description given below when taken in connection with the accompanying drawings which form part of the specification and which illustrate one present preferred form of the invention.

Briefly and considered in its broadest aspects the invention contemplates mounting the lens combination of the sound assembly on a talking-movie apparatus in ready and adjustable relation to the exciter lamp of the assembly as well as in operable relation to the light-sensitive cell which is usually employed in such assemblies.

To this end the lens combination is securely fastened in clamping members which are in turn adjustably and slidably fastened to suitable spaced supports such as spaced rods or bars disposed securely on the mechanism-supporting wall or partition of the projection head of the machine.

The lens combination thus supported is provided with a simple adjusting knob provided with means engaging one or more of the supporting elements so that as the knob is manipulated the lens combination unit can be readily moved to or from the exciter lamp or the light sensitive cell as may be desired. The lens combination unit is also, during its movement and at all times, constructively associated with certain light shielding means so that no matter what position it is caused to assume the light from the exciter lamp passing therethrough will be efficiently and properly enclosed. The shields are also constructively related to and associated with the usual film gate which is fixed to the supports adjacent the lens combination unit in such manner that all the light thus shielded properly passes through the gate to the film and the construction is such as to permit the quick and ready adjustment of the lens combination while shielding the light and without disturbing the position of the gate itself on account of the movement of the lens combination.

The present preferred form of the invention is shown in the drawings of which.

The present preferred form of the invention is illustrated as applied to a motion picture machine in which the projection of pictures in motion is accompanied with the production of synchronous and related sound otherwise known as talking movie projectors. It is particularly illustrated in a form of such machine for portability in the form of a suit case projector. The general view of the machine is shown in Fig. 1 and in this figure is shown the enclosing casing A, the upper film magazine B, lower film magazine C, lamp house unit D, lens combination unit E for projection of the pictures, and sound reproducing unit F, shutter guard casing G, and film H.

The preferred portion of the sound reproducing unit of this invention is illustrated herein but attention is also directed to my co-pending applications, Serial No. 440,204, filed March 31, 1930, and entitled Support and adjustment for speaking movie photo cell, Serial No. 432,313, filed March 1, 1930, and entitled Support and adjustment for speaking movie exciter lamp, now Patents No. 1,847,643, granted March 1, 1932, and No. 1,863,300, granted June 14, 1932.

Figure 2:
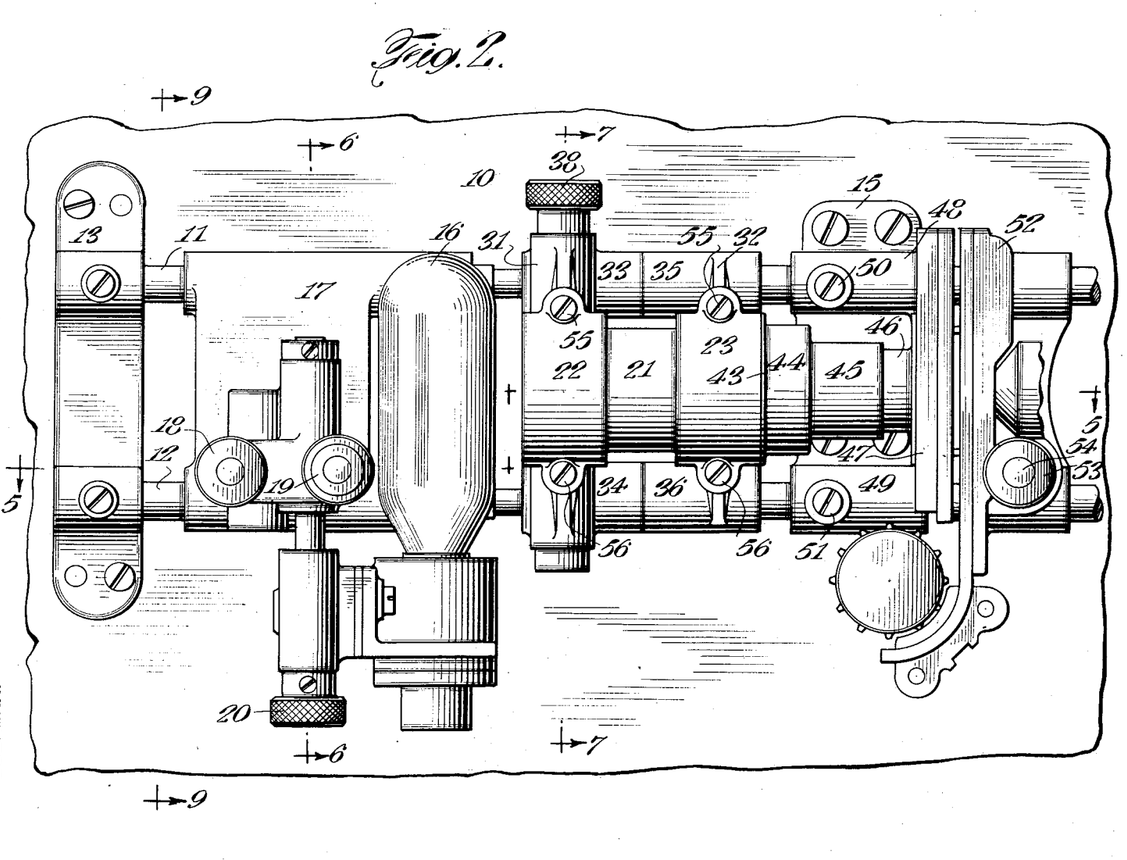
Fig. 2 is an enlarged side elevation of the sound assembly.
Figure 3:
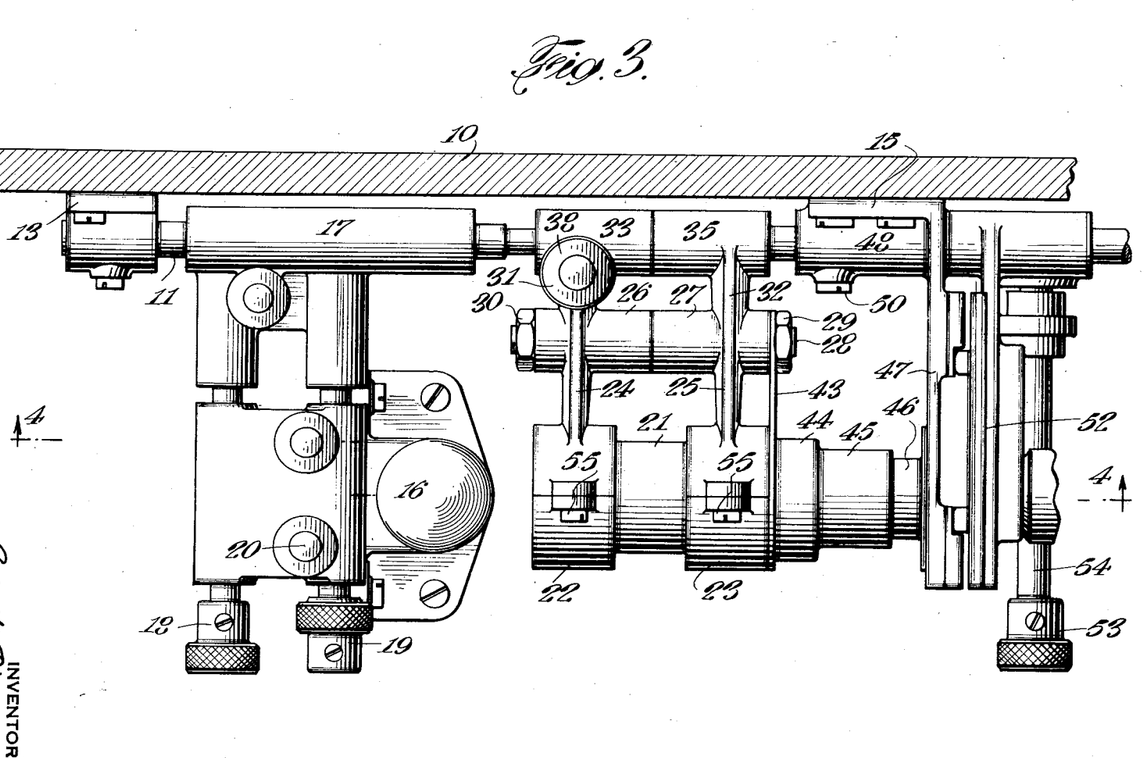
Fig. 3 is a plan view of the unit shown in Fig. 2.
Figure 4:
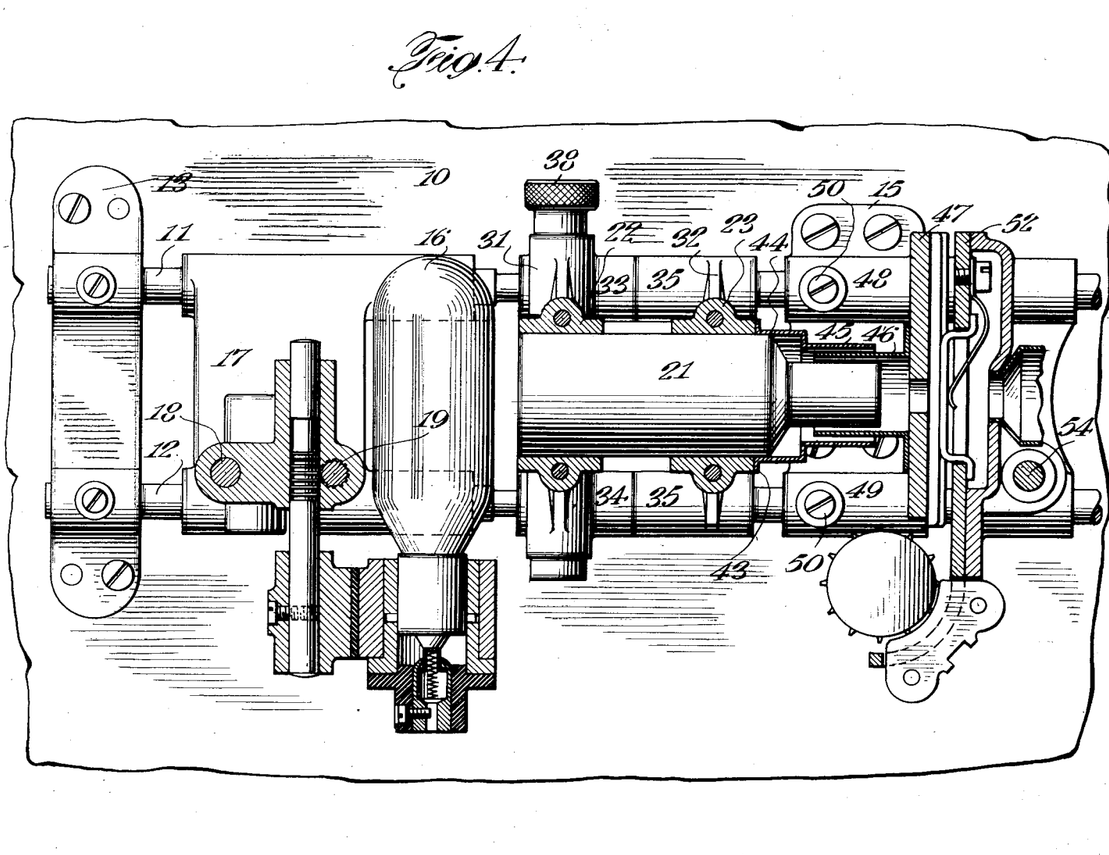
Fig. 4 is a vertical longitudinal section taken on the line 4—4 of Fig. 3.
Figure 5:
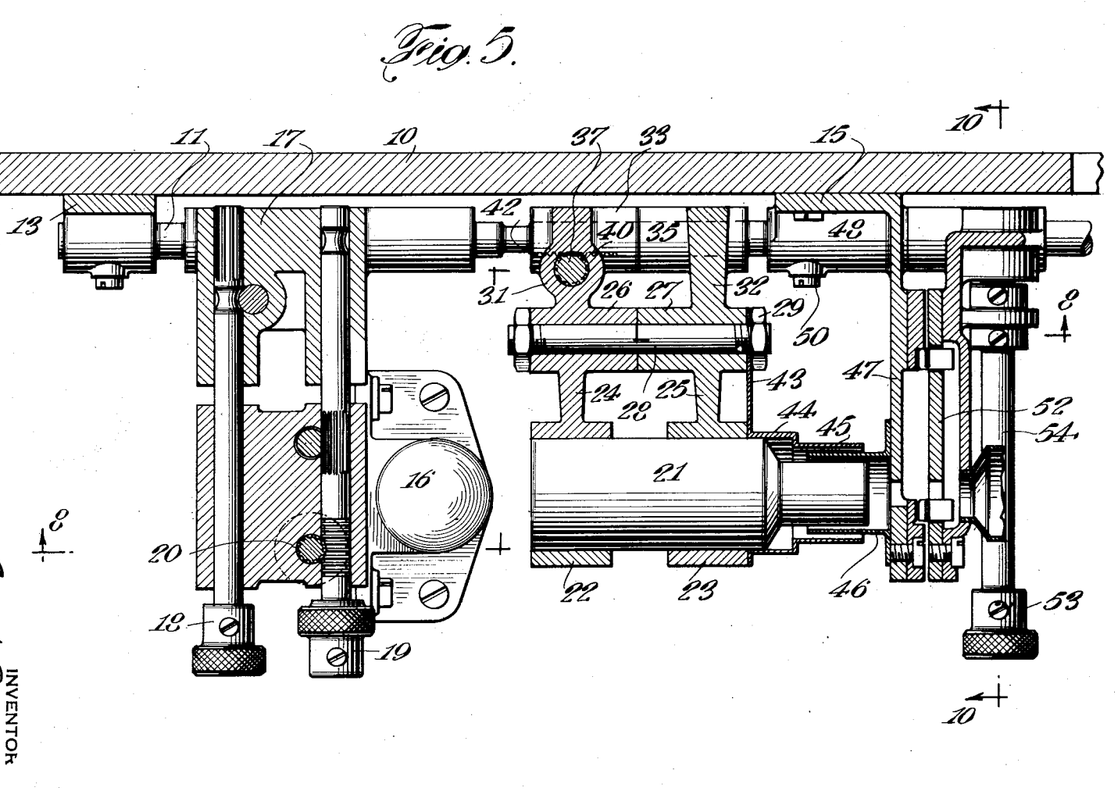
Fig. 5 is a horizontal longitudinal section taken on the line 5—5 of Fig. 2.
Figure 6:
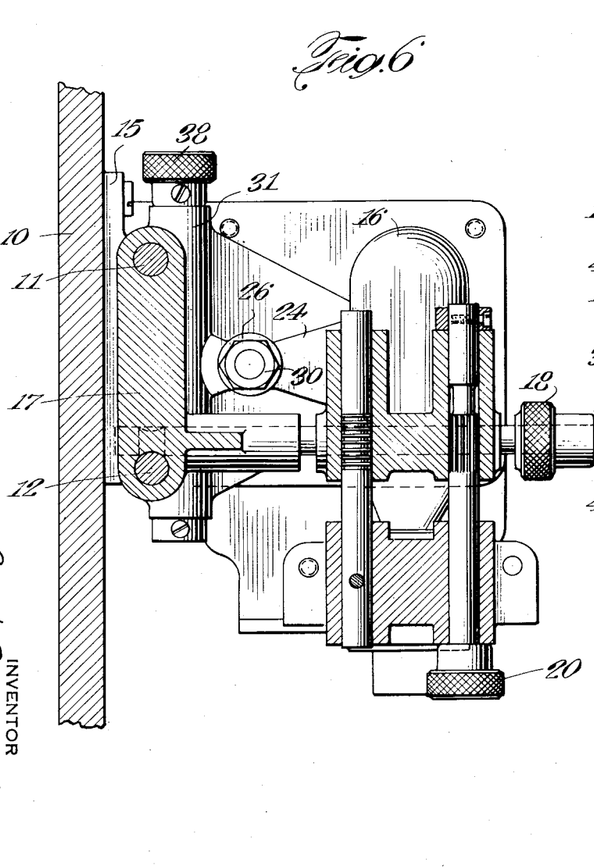
Fig. 6 is a vertical transverse section taken on the line 6—6 of Fig. 2.
Figure 7:
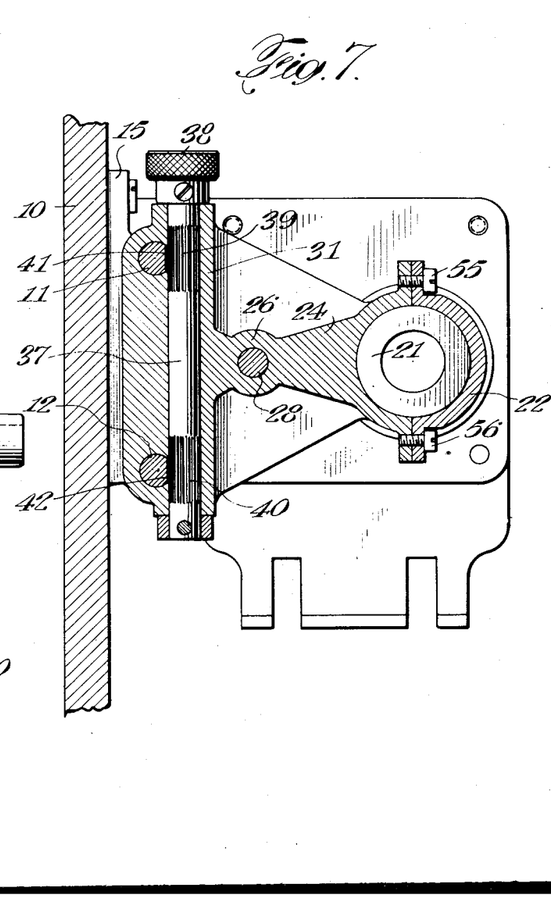
Fig. 7 is a similar section taken on the line 7—7 of Fig. 2.
Figure 8:
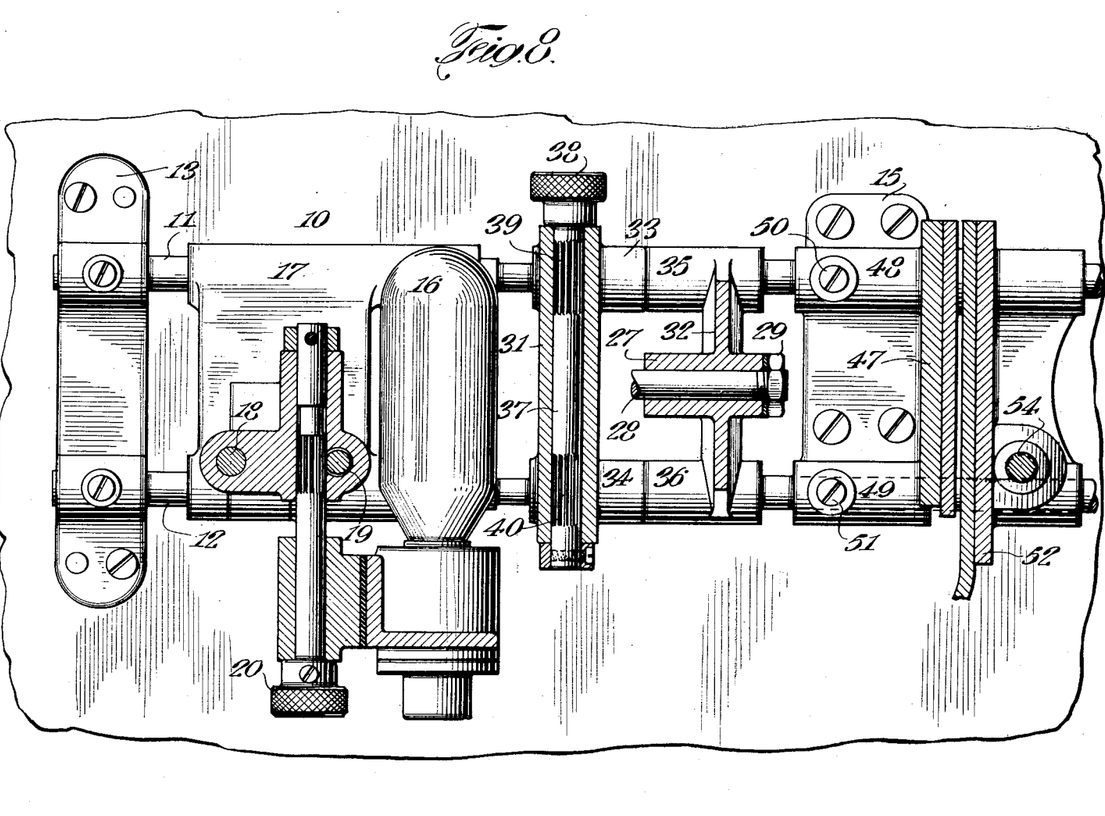
Fig. 8 is a vertical longitudinal section taken on the line 8—8 of Fig. 5.
Figure 9:
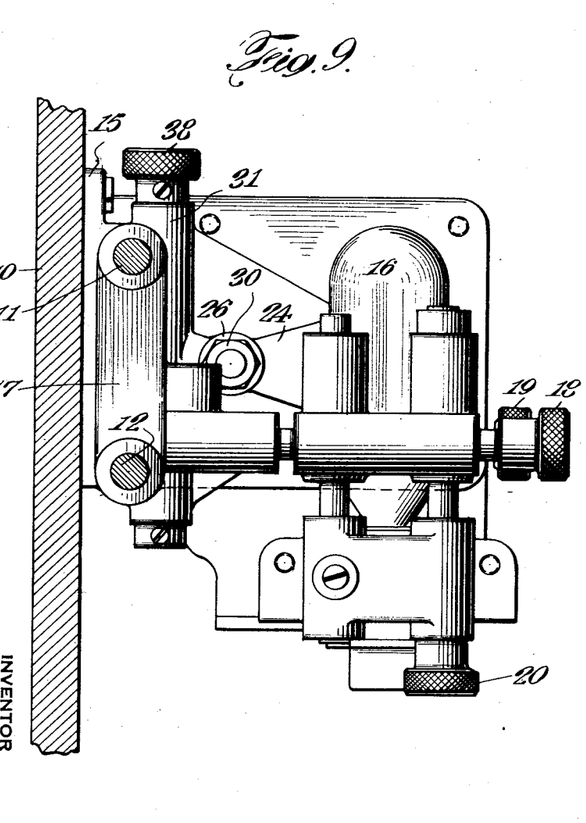
Fig. 9 is a vertical transverse section taken on the line 9—9 of Fig. 2.
Figure 10:
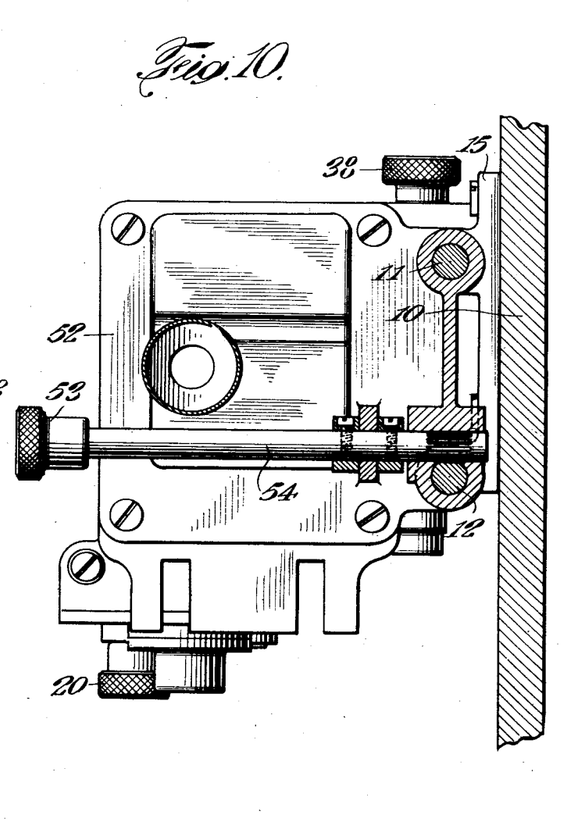
Fig. 10 is a similar section taken on the line 10—10 of Fig. 5.

As shown in Fig. 2 the sound unit is suitably mounted in the machine such as on the central partition of the vertical mechanism-supporting wall 10 which is common in modern projectors. The unit is supported from preferably two spaced rods 11 and 12 which extend horizontally along the one side of the wall 10 and are fastened thereto by means of brackets such as 13, 14, and 15. Adjacent the bracket 13 there is disposed an exciter lamp 16 adjustably mounted on a support 17 which is slidable along the rods 11 and 12. The manner of the adjustment and manipulation of the lamp 16 is shown and described and claimed in the above mentioned Patent No. 1,863,300. This adjustment is effected by manipulation of the adjusting screws 18, 19, and 20.

Figure 1:
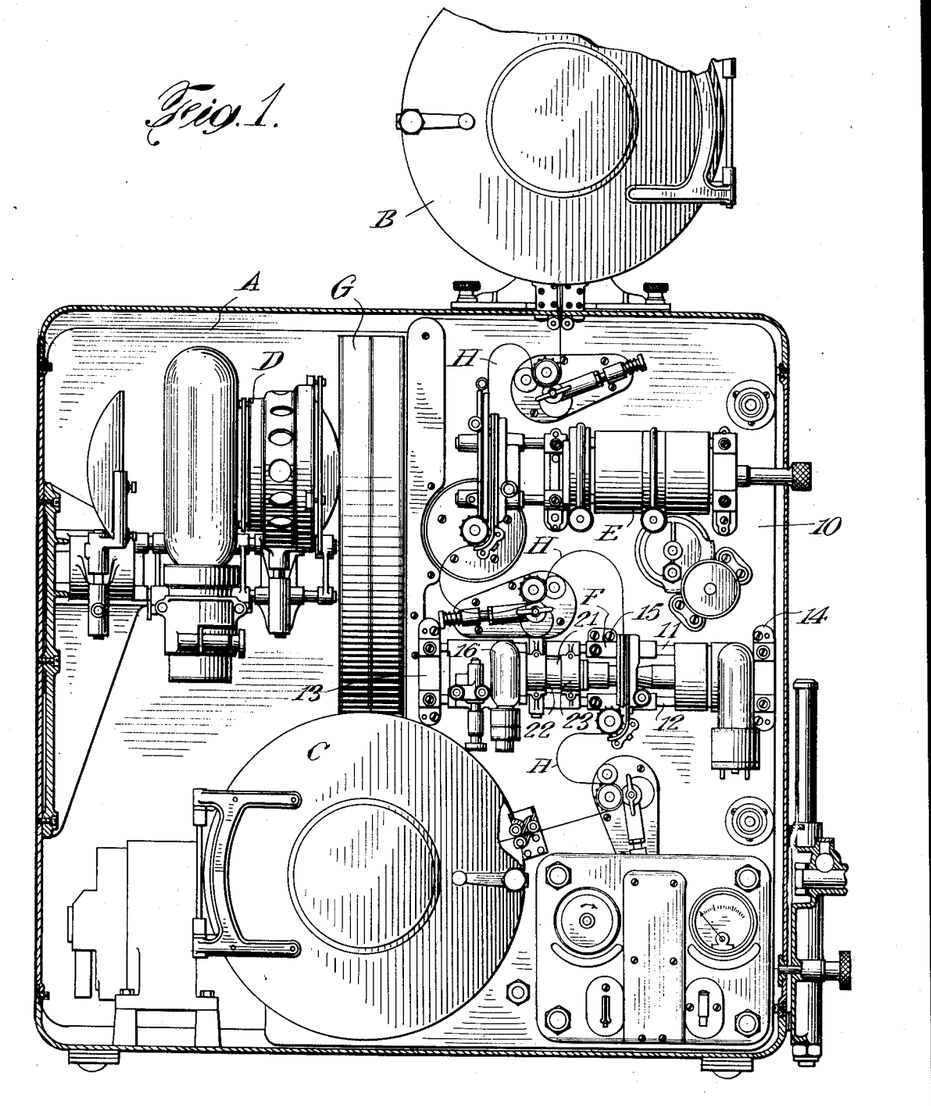
Fig. 1 is a side elevation of that side of the talking-movie projector which supports the light projecting and film handling elements as well as the sound elements.

Adjacent the exciter lamp is disposed the lens combination unit F, thus designated in Fig. 1. This unit as far as this invention is concerned, comprises a lens combination element or casing 21 which may be of any suitable type and contain any desired combination of lenses for the purpose in view. This element 21 is firmly supported preferably in a horizontal position in spaced collars 22 and 23 into which the element 21 snugly fits. The collars 22 and 23 are respectively provided with inwardly extending horizontal arms 24 and 25 having intermediate sleeves 26 and 27 bored to receive an elongated bolt 28, the nuts 29 and 30 on the ends of which cause it to hold the arms and hubs tightly together. The inner ends of the arms 24 and 25 are connected preferably integrally to upright plates 31 and 32 which respectively have collars 33, 34, and 35, 36 at their upper and lower portions. These collars 33, 34 and 35, 36 are bored to receive the rods 11 and 12. One of the plates such as 31 is vertically bored to receive an operating shaft 37 having an upper operating knob 38 and provided with teeth 39 and 40 engaging with teeth 41 and 42 on the rods 11 and 12. The turning of the knob 38 will then cause the movement of the lens combination unit along the rods 11 and 12 and the fit of the parts and the friction thereof is such that when adjusted in one position they will stay there indefinitely.

To a face of the sleeve 27 there is fastened a thin shield plate 43 which extends toward the collar 23 and in line with the opening therein is formed in the shape of preferably integral sleeves 44 and 45 of successively smaller diameter axially alined with the axis of the lenses in the lens combination element 21. The smaller sleeve 45 is adapted to slide back and forth with the movement of the support and is telescopically related to a similar and in this case smaller shielding sleeve 46 which is fixed to the rear face of the sound film gate plate 47.

This sound film gate plate 47 is supported on the bracket member 15 and has collars 48 and 49 which surround the rods 11 and 12. The collars 48 and 49 are provided with set screws 50 and 51 whereby they may be set on the rods 11 and 12 as desired.

The film gate plate 47 is in the usual manner related and disposed adjacent to the film gate plate door 52 which is supported on the rods 11 and 12 and operated to slide therealong by means of the operating knob 53 on shaft 54 geared up with either one or both of the rods 11 and 12 in a manner such as set forth in my above mentioned Patent No. 1,847,643.

The collars 22 and 23 are preferably made in two pieces which can be held together by means of set screws such as 55 and 56 so that it is an easy matter to insert the lens combination element 21 into position.

It will therefore be observed that this invention provides a simple compact and easily adjustable lens combination unit for the sound reproducing assembly of a talking-movie machine. The simple support on the wall 10 acts to support not only the exciter lamp and the light-sensitive cell, but also the adjustable lens combination. The combination can be manipulated with a slight movement of a finger to adjust it with respect to the exciter lamp and with respect to the fixed film gate. The exciter lamp can also be regulated and adjusted in a variety of directions by simple manipulations. Thus on the one single compact rigid support are mounted the three elements which go to make up the sound reproducing unit and which are easily quickly and accurately adjusted with respect to the support and to each other. Thus the utmost light efficiency and the best reproduction of the sound can be obtained and without employing a mass of complicated mechanism.

While the invention has been described in detail and with respect to a present preferred form thereof, it is not to be limited to such details and forms since many changes and modifications may be made and the invention embodied in other forms and modifications without departing from the spirit and scope of the invention when considered in its broadest aspects. Hence it is desired to cover any and all forms and modifications of the invention which may come within the language or scope of any one or more of the appended claims.

What is claimed, is,

1. In a sound unit for talking-movie projectors having a mechanism-supporting partition, a pair of spaced supports removably mounted on said partition, a movable and adjustable exciter lamp disposed on said supports, a movable and adjustable lens combination unit disposed on said supports, and a fixed film gate plate disposed on said supports.

2. In a sound unit for talking-movie projectors having a mechanism-supporting partition, a pair of spaced supporting rods removably mounted on said partition, a lens combination unit slidably disposed on said rods, a rotatable element on said unit geared to at least one of said rods to move the unit along the rods when turned.

3. In a sound unit for talking-movie projectors, the combination of a pair of spaced rods, an exciter lamp disposed thereon, means for adjusting the lamp on the rods, a lens combination unit also disposed on said rods, means for moving the unit horizontally along the rods, and a fixed film gate plate disposed on the rods adjacent the lens combination unit.

4. In a sound unit for talking-movie projectors, the combination of a pair of spaced rods, an exciter lamp disposed thereon, means for adjusting the lamp on the rods, a lens combination unit also disposed on said rods, means for moving the unit horizontally along the rods, a fixed film gate plate disposed on the rods on the side of the unit opposite the exciter lamp.

5. In a sound unit for talking-movie projectors, the combination of a pair of spaced rods, an exciter lamp disposed thereon, means for adjusting the lamp on the rods, a lens combination unit also disposed on said rods, means for moving the unit horizontally along the rods, a fixed film gate plate disposed on the rods on the side of the unit opposite the exciter lamp, and shielding means on the unit and the gate plate to permit the adjustment of the unit while preventing the escape of light.

6. In a sound unit for talking-movie projectors, the combination of a pair of spaced rods, a pair of plates, collars on said plates bored to receive said rods, means for holding said plates together, a pair of split collars on said plates, and a lens combination disposed in said split collars.

7. In a sound unit for talking-movie projectors, the combination of a pair of spaced rods, a pair of plates, collars on the plates bored to receive said rods, means for holding said plates together, a pair of split collars on said plates, a lens combination disposed in said split collars, and a rotatable member on one of said plates and geared to at least one of said rods to cause movement of the plates along said rods when the member is turned.

8. In a sound unit for talking-movie projectors, the combination of a pair of spaced rods, a pair of plates, collars on said plates bored to receive said rods, means for holding said plates together, a pair of split collars on said plates, a lens combination disposed in said split collars, a rotatable member on one of said plates and geared to at least one of said rods to cause movement of the plates along said rods when the member is turned, a fixed film gate plate fastened to the rods adjacent the lens combination unit, a shield on said film gate plate for the light, and a similar shield on the adjacent face of the unit telescopically co-operating with the first shield to permit movement of the unit while preventing escape of the light.

AUGUSTO DINA.